July 20, 1937.  W. R. MILLER  2,087,261

TWO-SPEED GENERATOR PULLEY

Filed Aug. 13, 1934

Inventor
Warren R. Miller.
By Frank N. Halliday
Attorney

Patented July 20, 1937

2,087,261

UNITED STATES PATENT OFFICE 2,087,261

TWO-SPEED GENERATOR PULLEY

Warren R. Miller, San Antonio, Tex.

Application August 13, 1934, Serial No. 739,609
3 Claims. (Cl. 74—289)

(Granted under the act of March 3, 1883, as
amended April 30, 1928; 370 O. G. 757)

This invention described herein may be manufactured and used by or for the Government for governmental purposes, without the payment to me of any royalty thereon.

My invention generically relates to automobile generator assemblies, more specifically it is directed to a mechanism in connection with the generator assembly whereby the generator output may be increased to meet excess load conditions imposed by automobile accessories.

One object of this invention is to provide a mechanism in connection with a generator assembly which will increase the output of the generator to meet the extra load conditions imposed by automobile heaters, radios and other similar apparatus.

Another object of this invention is to provide a manually controlled clutch actuated device in connection with the generator assembly to step up the output to meet extra load requirements.

Briefly stated this invention comprises a generator, its armature shaft, a gear keyed to the shaft, a pulley loosely mounted on the shaft, the pulley being provided internally with a circumferential extending gear, a carrier plate, a planetary gearing system supported by the carrier plate and adopted to convey the drive from the circumferential extending gear to the gear keyed to the armature shaft, and a combined clutch and brake mechanism, coacting with the carrier plate whereby the latter may be fixed so that the drive extending through the planetary system will increase the speed of the armature shaft.

To more fully understand the invention reference will be had to the accompanying drawing in which like parts are indicated by similar reference characters and in which—

Figure 3:
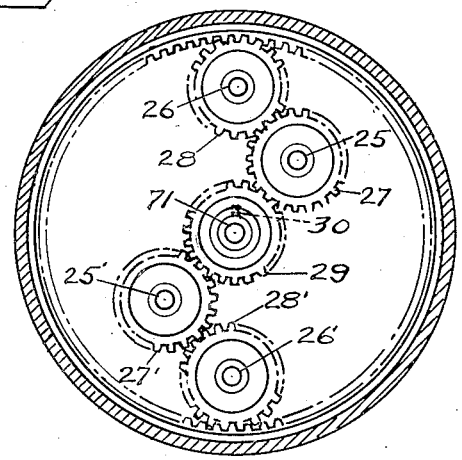
Fig. 3 is a front elevation of the epicycloidal gear train taken along the line 3—3 in Fig. 1.
Figure 4:
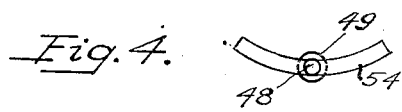
Fig. 4 shows a top plan view of the clutch operating member.

Referring to the drawing the numeral (10) indicates the two speed pulley and (70) indicates the generator to which it is coupled. The pulley comprises two principal parts, the sheave wheel (11) and the pinion disc (12). The sheave wheel is formed with a circular disclike side wall (13) having a central hub (14) and a circumferential rim (15) which is provided with a concave groove (16) for the reception of a pulley belt (17). The rim (15) is formed with an internal gear (18), which meshes with the driving pinions as will be hereinafter described. The sheave wheel (11) is rotatably mounted on a sleeve (19) and retained thereon by a collar (20) rigidly attached to said sheave by a set screw (21). The sleeve (19) is locked to the armature shaft (71) of the generator (70) by means of the key (22). The pinion disc (12) comprises a circular disc (23) which is provided with a central hub (24). The disc functions both as a side wall for the pulley housing formed between it and side wall (13) of the sheave wheel (11), and as a support for the pinion bearings (25), (25'), (26) and (26'), on which the driving pinions (27), (27'), (28) and (28') are mounted. Within the pulley housing (12), between the hubs (14) and (24) of the sheave wheel (11) and the pinion disc (12), is mounted the pinion (29) which is rigidly held to the sleeve (19) by the set screw (30). This pinion (29) meshes with the inner pinions (27) and (27') as shown in Fig. 3.

A driving clutch disc (31) provided with a central hub (32) is slidably mounted on the sleeve (19) exterior to the pulley housing and adjacent the hub (24) of the pinion disc (12). This clutch disc (31) is provided with a clutch facing (33) and is caused to rotate with the pinion disc (12) by means of a plurality of pins (34) and (34'), which are rigidly attached to the pinion disc (12), and slidably project through openings (36) and (36'), in the clutch disc (31) to permit lateral movement of the same along the sleeve (19).

The pins (34) and (34') are provided with helical springs (38) and (38'), which are interposed between the pinion disc (12) and the clutch disc (31), and function to move the clutch disc outward from the pinion disc to provide for clutching engagement of said disc (31) with a companion driven clutch disc (40). The driven clutch disc (40) is of similar construction to the driving clutch disc (31), but of smaller diameter. This disc (40) is also provided with a central hub (41), which is rigidly attached to the sleeve (19), by the set screw (42), and is provided with a clutch facing (43).

It will be noted from the foregoing description that the driven clutch disc (40) which is rigidly attached to the sleeve (19) revolves with the armature shaft (71) of the generator (70), whereas the driving disc (31) is rotatably mounted on the sleeve (19) and revolves with the armature shaft (71) only when in engagement with the disc (40) through contact of the disc facings (33) and (43).

Longitudinal movement of the disc (31) into and out of engagement with the disc (40) is accomplished by means of the helical springs (38) and (38') and the clutch control devices (44) and (44'), which move the disc (31) against the reaction of these springs. The clutch disc shifting devices (44) and (44') are identical in structure so it will be necessary to describe only one of these units, which is composed of a cylindrical casing (45) provided at one end with a flange (46), for attachment to the generator housing (72). The other end of the cylinder is flanged inwardly at (50), to retain a helical return spring (47), but provided with a central opening of sufficient diameter to allow for sliding movement of a clutch operating member (48). The cylindrical casing (45) is longitudinally slotted at (51) to provide for movement therein of the cam slide (52), which has formed integral therewith cams (53) and (53').

The clutch operating members (48) and (48') are each formed respectively with discs (49) and (49') at their inner extremity, which are acted upon by the cams (53) and (53') of the cam slide (52) and by the springs (47) and (47'), at their outer extremity, the clutch operating member (48) is provided with contact sectors (54) and (54') adapted to frictionally engage the clutch facing (33). The discs (49) and (49') of the clutch operating members (48) and (48') are acted upon by the cams (53) and (53') against the reaction of the springs (47) and (47') to move the clutch operating members outward and the sectors (54) and (54') out of frictional contact with the clutch facing (33) to release engagement of the clutch, and as the pressure of the cams (53) and (53') is released from the discs (49) and (49') by downward movement of the cam slide (52), the contact sectors (54) and (54') are withdrawn from frictional contact with the clutch facing (33) by action of the springs (47) and (47') and the facings (33) and (43) of the clutch discs (31) and (40) are moved into frictional engagement.

Figure 1:
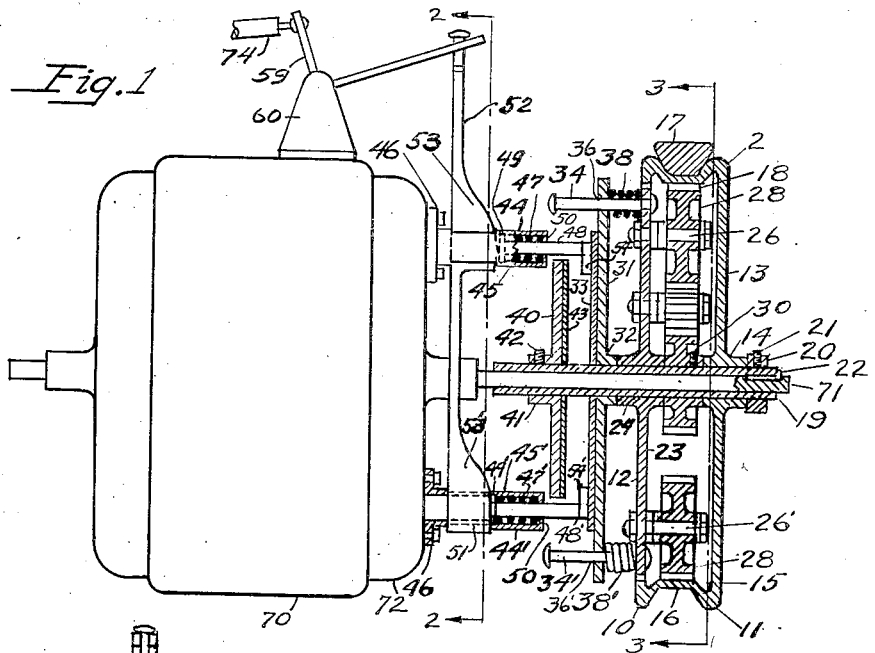
Fig. 1 shows a side elevation partially in section of the two-speed pulley coupled to a generator.
Figure 2:
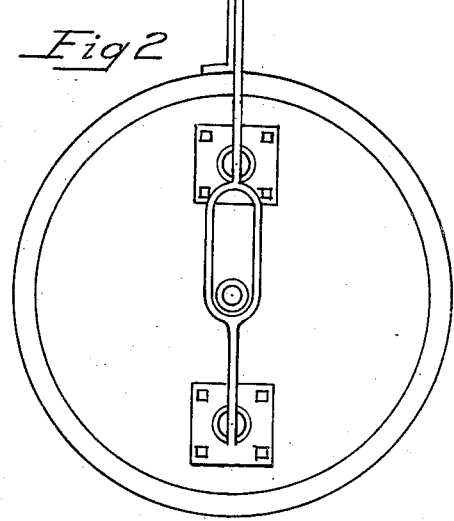
Fig. 2 is a front elevation of the generator taken along the line 2—2 in Fig. 1.

The cams (53) and (53') which are formed integral with cam slide member (52) are operated from the cowl or instrument board of the vehicle by means of a cardan wire (74), which actuates a bell crank (59) pivotally mounted in the bracket (60) which is attached to the top of the generator housing (72). A front elevation of the cam slide (52) is shown in Fig. 2, where it will be noted the central portion of the member is divided to provide for the passage of the armature shaft (71). It will be noted in the construction of the two speed clutch that the only members which are rigidly attached to the generator shaft are the clutch disc (40) and the central pinion (29).

The sheave wheel (11) as well as the pinion disc (12) are rotatably mounted upon the sleeve (19). The clutch disc (31) is not only rotatably mounted upon the sleeve (19), but also longitudinally slidable thereon. When the clutch discs are in engagement with each other, the clutch discs (40) and (31), the pinion disc (12), the sheave wheel (11), and the pinions (27), (27'), (26), (26') and (29) all revolve as a unit with the generator shaft without rotating on their respective axes, because there can be no relative rotary movement between the pinions as the disc to which their bearings are mounted can only rotate with its axis and not about it. When the clutch discs (40) and (31) are not in engagement and the clutch disc (31) and pinion disc (12) held stationary by the clutch control devices (44) and (44'), the sheave wheel (11), through the internal gear (18) rotates the pinion gears (28) and (28'), which in turn rotate the pinion gears (27) and (27'). The latter pinion gears are in mesh with the central pinion gear (29) attached to the generator shaft. The change of ratio effected by driving through the intermediate pinion gears greatly increases the speed of rotation of the armature shaft in relation to the speed of rotation of the sheave.

I claim:

1. In combination with a generator shaft, a sleeve keyed to said shaft, a drive pulley comprising an internally geared sheave wheel, and a bearing disc, each rotatably mounted on said sleeve, and an epicyclic gear train comprising an internal gear on the sheave wheel, inner and outer epicycloidal pinion gears mounted on said bearing disc and a central pinion gear rigidly attached to said sleeve, a longitudinally slidable driving clutch disc rotatably mounted on said sleeve and rotatably coupled with said bearing disc, a driven clutch disc rigidly attached to said sleeve adjacent said slidable driving disc and manually operated means comprising clutch control devices adapted to move the driving clutch disc out of frictional engagement with the driven clutch disc and adapted to prevent revolution of the driving disc causing transmission of power from the sheave wheel to the shaft through the gear train, and means comprising springs adapted to lock the epicyclic pinion gears against rotation to cause transmission of power therethrough and unite the gear train and pulley to effect rotation of the same as a unit.

2. A speed change mechanism for generators comprising a sleeve adapted to be keyed to said generator shaft, a drive pulley, comprising an internally geared sheave wheel, and a bearing disc, each rotatably mounted on said sleeve, a central pinion gear rigidly attached to said sleeve, and intermediate epicyclic pinion gears rotatably mounted on said bearing disc meshing with the internal gear of said sheave wheel and said central pinion gear, a longitudinally slidable driving clutch disc rotatably mounted on said sleeve and rotatably coupled with said bearing disc, a driven clutch disc rigidly attached to said sleeve adjacent said driving disc, and manually operated means comprising clutch control devices adapted to move the driving clutch disc out of frictional engagement with the driven clutch disc and adapted to prevent revolution of the driving disc causing transmission of power from the sheave wheel to the shaft through the gear train, and means comprising springs adapted to move the driving clutch disc into frictional engagement with the driven disc causing the clutch discs and drive pulley to rotate as a unit.

3. A speed change mechanism for generators comprising a sleeve adapted to be keyed to said generator shaft, a drive pulley, comprising an internally geared sheave wheel, and a bearing disc, each rotatably mounted on said sleeve, a central pinion gear rigidly attached to said sleeve, and intermediate epicyclic pinion gears rotatably mounted on said bearing disc meshing with the internal gear of said sheave wheel and said central pinion gear, a longitudinally slidable driving clutch disc rotatably mounted on said sleeve and rotatably coupled with said bearing disc, a driven clutch disc rigidly attached to said sleeve adjacent said driving disc, and manually operated cam controlled clutch disc shifting devices comprising a plurality of slotted casings, slidable operating members provided with contact sectors fitted within said casings, cam slides fitted within the slots of said casings adapted to move said operating member in a clutch disengaging direction, and return springs adapted to retract said operating members into a clutch engaging position and means comprising said contact sectors adapted to prevent the rotation of said driving clutch disc when disengaged from frictional contact with said driven disc.

WARREN R. MILLER.